Nov. 23, 1926.

T. SANO 1,608,040

GEAR CONTROLLING DEVICE

Filed July 13, 1926    2 Sheets-Sheet 1

Tomitaro Sano
INVENTOR

BY

ATTORNEY

WITNESSES
C. L. McDonald
E. N. Lovewell

Nov. 23, 1926.  
T. SANO  
1,608,040  
GEAR CONTROLLING DEVICE  
Filed July 13, 1926      2 Sheets-Sheet 2
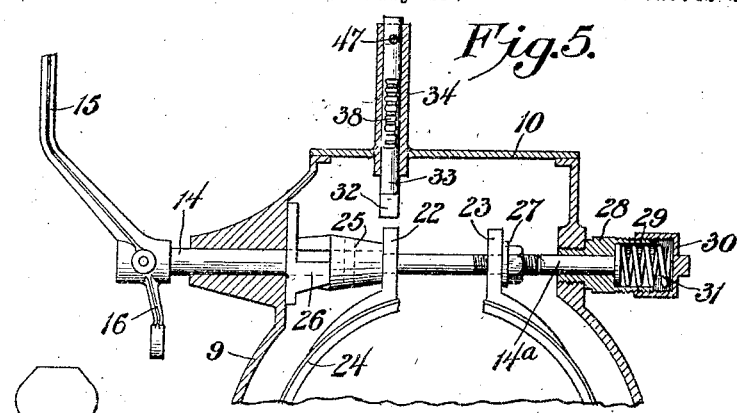
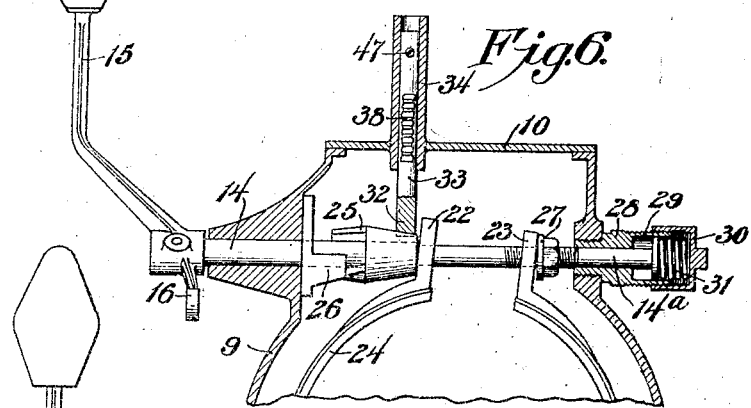
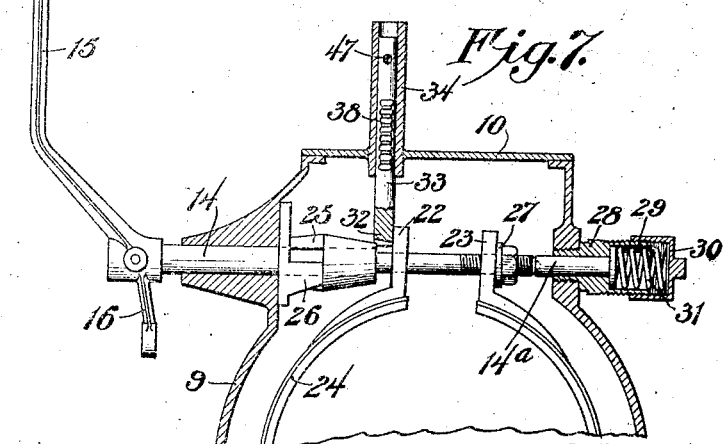
Tomitaro Sano  
INVENTOR
WITNESSES
BY
ATTORNEY Patented Nov. 23, 1926.

1,608,040

UNITED STATES PATENT OFFICE.

TOMITARO SANO, OF MADERA, CALIFORNIA.

GEAR-CONTROLLING DEVICE.

Application filed July 13, 1926. Serial No. 122,125.

This invention relates to a gear controlling device, especially adapted to be used in connection with an automobile transmission mechanism of the planetary type.

With this type of transmission, as it is usually arranged, the clutch pedal is fully depressed to shift the mechanism into low gear, and is released to shift into high gear. As a consequence, in mountainous regions, where long steep grades are common, it is necessary to hold the pedal continuously depressed for a considerable length of time while running in low gear, and this makes driving very arduous.

With the above conditions in mind, it is the object of the present invention to provide a simple and practical device, which may be used in connection with the usual type of planetary transmission, and which obviates the necessity of using the foot to hold the mechanism in low gear. The invention also includes means for positively holding the gear in neutral position with the clutch disengaged, without keeping the foot on the clutch pedal or setting the emergency brake. The device, which constitutes the invention, may be easily connected in operative relation to the transmission mechanism without any substantial alteration in the construction or operation of the latter.

The specific structure of the invention and its mode of operation, together with the advantages resulting therefrom, will be more fully explained in connection with the accompanying drawings illustrating the same.

In the drawings:

Figure 5 is a vertical transverse section taken along the line of the low speed shaft, parts being shown in neutral position.

Figure 6 is a similar view showing an intermediate step in shifting to low gear.

Figure 7 is a similar view with the parts in low gear position.

Figure 1:
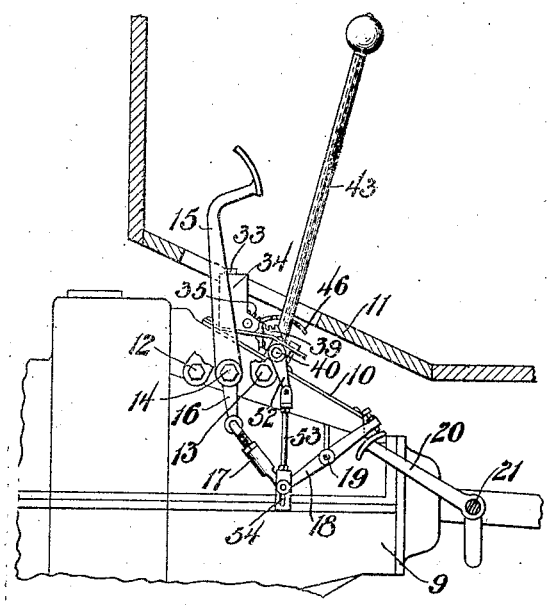
Figure 1 is a side elevation of an assembly in which the invention is used, parts being broken away or shown in section, and the gears being in neutral position.
Figure 3:
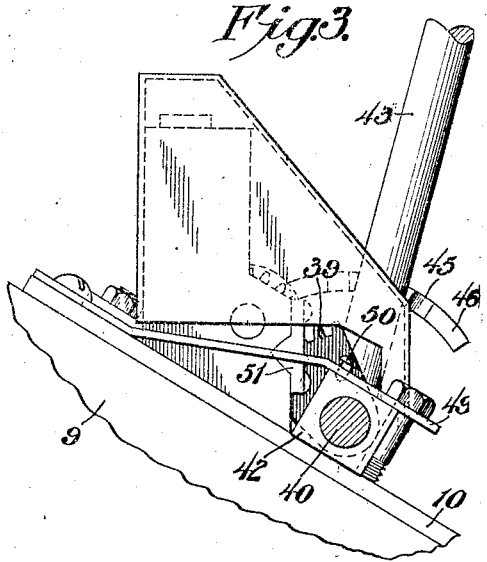
Figure 3 is a section through the upper part of the device taken on the line 3—3 of Figure 2.
Figure 2:
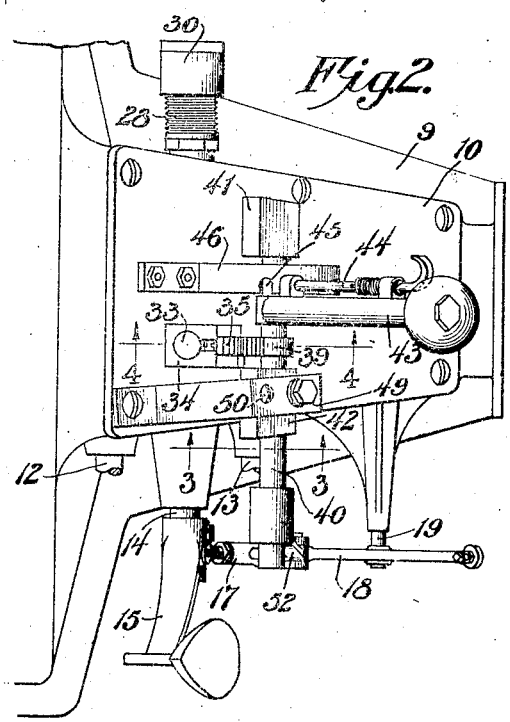
Figure 2 is a plan view of the same.
Figure 4:
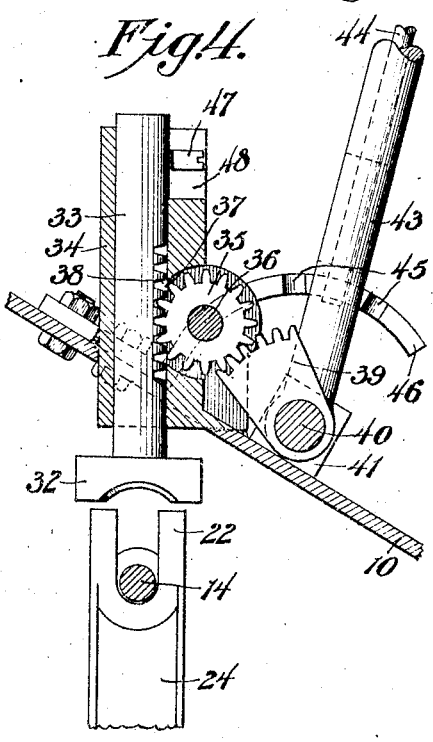
Figure 4 is a section taken on the line 4—4 of Figure 2.

The invention is illustrated in connection with a planetary transmission mechanism located in a housing 9, provided with a removable cover plate 10, and located beneath the floor board 11. This type of transmission is customarily provided with a reverse pedal shaft 12, a brake pedal shaft 13, and a low gear shaft 14, the clutch and gear pedal for operating the latter being shown at 15. The pedal 15 has an extension 16 below the shaft 14, and this extension is connected by a link 17 to the lower end of the clutch lever 18, which is secured to the clutch lever shaft 19. When the pedal 15 is depressed to intermediate position, the shaft 19 is rocked to disengage the clutch, so that the transmission mechanism will be in what is termed neutral position. As usually constructed, when the pedal 15 is depressed all the way down, the low gear band is tightened, and the parts are in what is termed low gear position. The clutch lever shaft 19 may also be held in disengaging position by an arm 20 secured to a controller shaft 21, which is actuated by means of the usual hand or emergency brake lever.

The low gear shaft 14, as shown in Figure 5, passes through ears 22 and 23 secured to the ends of the low gear band 24. A cam 25 secured to the shaft 14 cooperates with a cam 26, secured to the inside of the housing 9, to move the shaft 14 longitudinally when the low gear pedal 15 is fully depressed. This moves the ear 22 and the adjacent end of the band 24 inwardly. In the planetary transmission mechanism as heretofore constructed, the ear 23 is seated against a stationary abutment, so that the inward movement of the gear 22 acts immediately to tighten the band 24, and to throw the mechanism into low gear, and a compression spring, which usually surrounds the shaft 14 between the ears 22 and 23, returns the shaft 14 to its initial position as soon as the pedal 15 is released. In the present construction, however, the ear 23 rests against an abutment 27, which is secured on the shaft 14 itself, so that the depression of the pedal 15 initially moves the band 24 circumferentially, as shown in Figure 6, without tightening the same. The end portion of the shaft 14, remote from the pedal 15 bears against a plunger 14ª which is slidably mounted in a bearing 28, which is formed with a socket 29 having a cap 30 and enclosing a spring 31, which is compressed when the low gear shaft is moved to the position shown in Figure 6, and which expands against the end of the plunger to restore the shaft to its initial position as soon as the pedal is released.

In order to set the band 24 for operating in low gear, provision is made for preventing the return of the ear 22 to its outer position when the pedal 15 is released, so that the restoration of the ear 23 to its initial position, tightens the band 24, and throws the mechanism into low gear, as shown in Figure 7. This is accomplished through the medium of an abutment or head 32, carried by the lower end of a latch bar 33, which is slidably mounted in a vertical guideway 34, and adapted to be projected downwardly while the pedal 15 is still depressed. The position of the bar 33 is controlled by a pinion 35 mounted on a shaft 36, and projecting through a slot 37 in the guideway 34, and meshing with teeth 38 formed in the bar 33. The movement of the pinion 35 is controlled by a segment 39 meshing therewith, and secured to a rock shaft 40 mounted in bearings 41 and 42, which are supported on the cover plate 10. A hand operating lever 43 is secured to the rock shaft 40, and is provided with a spring-held latch 44, adapted to engage one of the notches 45 in a segment 46 secured to the plate 10.

The downward movement of the bar 33 is limited by a pin 47, which rides in a vertical slot 48 formed in the guideway 34, and the upward movement of the bar is limited by the engagement of the head 32 with the lower end of the guideway. The bearing 41 is permanently secured to the plate 10, while the bearing 42 is removably held beneath a keeper 49 secured by bolts or screws to the plate 10, and carrying a set screw 50 engageable with the bearing. The side of the guideway 34 is also provided with a removable section 51, so that when the keeper 49 is removed, the rock shaft 40 and the segment 39 may be assembled or disassembled by moving them endwise.

An arm 52 is secured to the shaft 40, and a link 53 is connected at one end to the arm, and at the other end has a pin and slot connection 54 with the end of the clutch lever 18. The slot is so arranged that when the lever 43 is in intermediate or neutral position, the arm 18 will be positively held to prevent engagement of the clutch regardless of the position of the arm 20, which is operated by the emergency brake lever. The pin and slot connection performs the same function when the lever 43 is moved rearwardly to low gear position, but is raised when the lever 43 is moved forwardly to high gear position, so as to permit the clutch to become engaged.

In the operation of my invention, assuming that the lever 43 is in intermediate or neutral position, in order to throw the mechanism into low gear, the pedal 15 is depressed, as shown in Figure 6, and the lever 43 is moved rearwardly to lower the bar 33 and head 32, so that the latter is behind the ear 22. Now, when the pedal 15 is released, the spring 31 expands and restores the shaft 14 to its initial position, while the ear 22 is held by the abutment or head 32. The ear 23 is forced inwardly by the abutment 27 carried by the shaft 14, and the low gear band 24 becomes set for the transmission to operate in low gear. The automobile may then be driven in low gear without having the foot on the pedal 15.

In shifting to high gear, the pedal 15 is initially depressed, and the lever 43 is swung forwardly as far as possible. This raises the link 53, and permits the shaft 19 to rock until the clutch engages. At the same time, the low gear band is released, as shown in Figure 5. In making other shifts, the pedal 15 is depressed and the lever 43 is moved to intermediate or neutral position.

While I have shown and described the specific construction of the invention in what at present seems to be its preferred form, it is apparent that various modifications may be made in the detailed construction and arrangement thereof without any material departure from the salient features of the invention as expressed in the claims.

What is claimed is:

1. In a controlling device for planetary gear transmission, the combination with the low gear shaft and a low gear band having ears through which said shaft passes, of abutments carried by said shaft between which the ears are held, means for temporarily displacing said shaft longitudinally, means for returning the shaft to its initial position and a latch projectable behind the ear which follows the other in the displacement of the shaft, thereby causing the band to be tightened when the shaft is returned to initial position.

2. In a controlling device for planetary gear transmission, the combination with the low gear shaft and a low gear band having ears through which said shaft passes, of abutments carried on said shaft between which the ears are held, means for temporarily displacing said shaft longitudinally, means for returning the shaft to its initial position, a slidably mounted latch having rack teeth thereon, gearing operatively associated with said rack teeth, and a hand lever controlling said gearing, said latch being so located that when it is advanced after said shaft has been displaced, it will project behind the ear which follows the other ear in the displacement of the shaft, thereby causing the band to be tightened when the shaft is returned to initial position.

3. In a controlling device for planetary gear transmission, the combination with the low gear shaft and a low gear band having ears through which said shaft passes, of abutments carried on said shaft between which the ears are held, means associated with one end of the shaft for displacing it longitudinally, a plunger bearing against the other end of the shaft, a spring acting on the plunger to restore the shaft to initial position as soon as the displacing means is released, and a latch projectable behind the ear which follows the other in the displacement of the shaft, thereby causing the band to be tightened when the shaft is returned to initial position.

4. In a controlling device for planetary gear transmission, a transmission band having terminal ears, means for temporarily displacing the band circumferentially, means for returning the band toward its initial position after the release of the displacing means and a latch projectable behind the ear which follows the other in the displacing movement, thereby causing the band to be tightened when the displacing means is released.

5. In a controlling device for planetary gear transmission, a transmission band having terminal ears, means for temporarily displacing the band circumferentially, means for returning the band toward its initial position after the release of the displacing means, a slidably mounted latch having rack teeth thereon, gearing operatively associated with said rack teeth, and a hand lever controlling said gearing, said latch being so located that when it is advanced, after the band has been displaced, it will project behind the ear which follows the other ear in the displacing movement, thereby causing the band to be tightened when the displacing means is released.

6. In a controlling device for planetary gear transmission, the combination with the low gear shaft and a low gear band having ears through which said shaft passes, of abutments carried on said shaft between which the ears are held, means for temporarily displacing said shaft longitudinally, means including a spring for returning the shaft to its initial position, a latch, means for projecting the latch behind the ear which follows the other in the displacement of the shaft, thereby causing the band to be tightened when the shaft is returned to initial position, a clutch lever, and means connected with the latch operating means and operable to positively depress the clutch lever when the latch is projected.

7. In a controlling device for planetary gear transmission, a transmission band having terminal ears, means for temporarily displacing the band circumferentially, means for returning the band toward its initial position when the displacing means is released, a latch, means for projecting the latch behind the ear which follows the other in the displacing movement, thereby causing the band to be tightened when the displacing means is released, a clutch lever, and means connected with the latch operating means and and operable to positively depress the clutch lever when the latch is projected.

In testimony, that I claim the foregoing as my own, I have hereto affixed my signature.

TOMITARO SANO.